(12) United States Patent
Heckerman et al.

(10) Patent No.: US 6,263,308 B1
(45) Date of Patent: Jul. 17, 2001

(54) METHODS AND APPARATUS FOR PERFORMING SPEECH RECOGNITION USING ACOUSTIC MODELS WHICH ARE IMPROVED THROUGH AN INTERACTIVE PROCESS

(75) Inventors: David E. Heckerman, Bellevue; Fileno A. Alleva, Redmond; Robert L. Rounthwaite, Fall City; Daniel Rosen, Bellevue; Mei-Yuh Hwang, Redmond; Yoram Yaacovi, Redmond; John L. Manferdelli, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/531,055

(22) Filed: Mar. 20, 2000

(51) Int. Cl.[7] .......................... G10L 15/02; G10L 15/06; G10L 11/06
(52) U.S. Cl. ........................ 704/231; 704/235; 704/270; 704/236
(58) Field of Search .................................. 704/252, 260, 704/270, 270.1, 243, 231, 236, 278, 238

(56) References Cited

U.S. PATENT DOCUMENTS

| | | | |
|---|---|---|---|
| 3,700,815 | * 10/1972 | Doddington et al. | 704/246 |
| 4,779,209 | * 10/1988 | Stapleford et al. | 704/278 |
| 5,333,275 | * 7/1994 | Wheatley et al. | 704/243 |
| 5,502,774 | * 3/1996 | Bellegarda et al. | 704/241 |
| 5,649,060 | * 7/1997 | Ellozy et al. | 704/278 |
| 5,737,725 | * 4/1998 | Case | 704/270 |
| 5,960,447 | * 9/1999 | Holt et al. | 704/270 |
| 6,064,957 | * 5/2000 | Brandow et al. | 704/235 |
| 6,076,059 | * 6/2000 | Glickman et al. | 704/260 |

OTHER PUBLICATIONS

Hauptmann et al, "Story Segmentation & Detection of Commericals in roadcast News Video", Research & Technology Advances in Digital Libraries, Apr. 24, 1998.*

* cited by examiner

Primary Examiner—Richemond Dorvil
Assistant Examiner—Daniel A. Nolan
(74) Attorney, Agent, or Firm—Straub & Pokotylo; Michael P. Straub

(57) ABSTRACT

Automated methods and apparatus for synchronizing audio and text data, e.g., in the form of electronic files, representing audio and text expressions of the same work or information are described. Also described are automated methods of detecting errors and other discrepancies between the audio and text versions of the same work. A speech recognition operation is performed on the audio data initially using a speaker independent acoustic model. The recognized text in addition to audio time stamps are produced by the speech recognition operation. The recognized text is compared to the text in text data to identify correctly recognized words. The acoustic model is then retrained using the correctly recognized text and corresponding audio segments from the audio data transforming the initial acoustic model into a speaker trained acoustic model. The retrained acoustic model is then used to perform an additional speech recognition operation on the audio data. The audio and text data are synchronized using the results of the updated acoustic model. In addition, one or more error reports based on the final recognition results are generated showing discrepancies between the recognized words and the words included in the text. By retraining the acoustic model in the above described manner, improved accuracy is achieved.

28 Claims, 12 Drawing Sheets

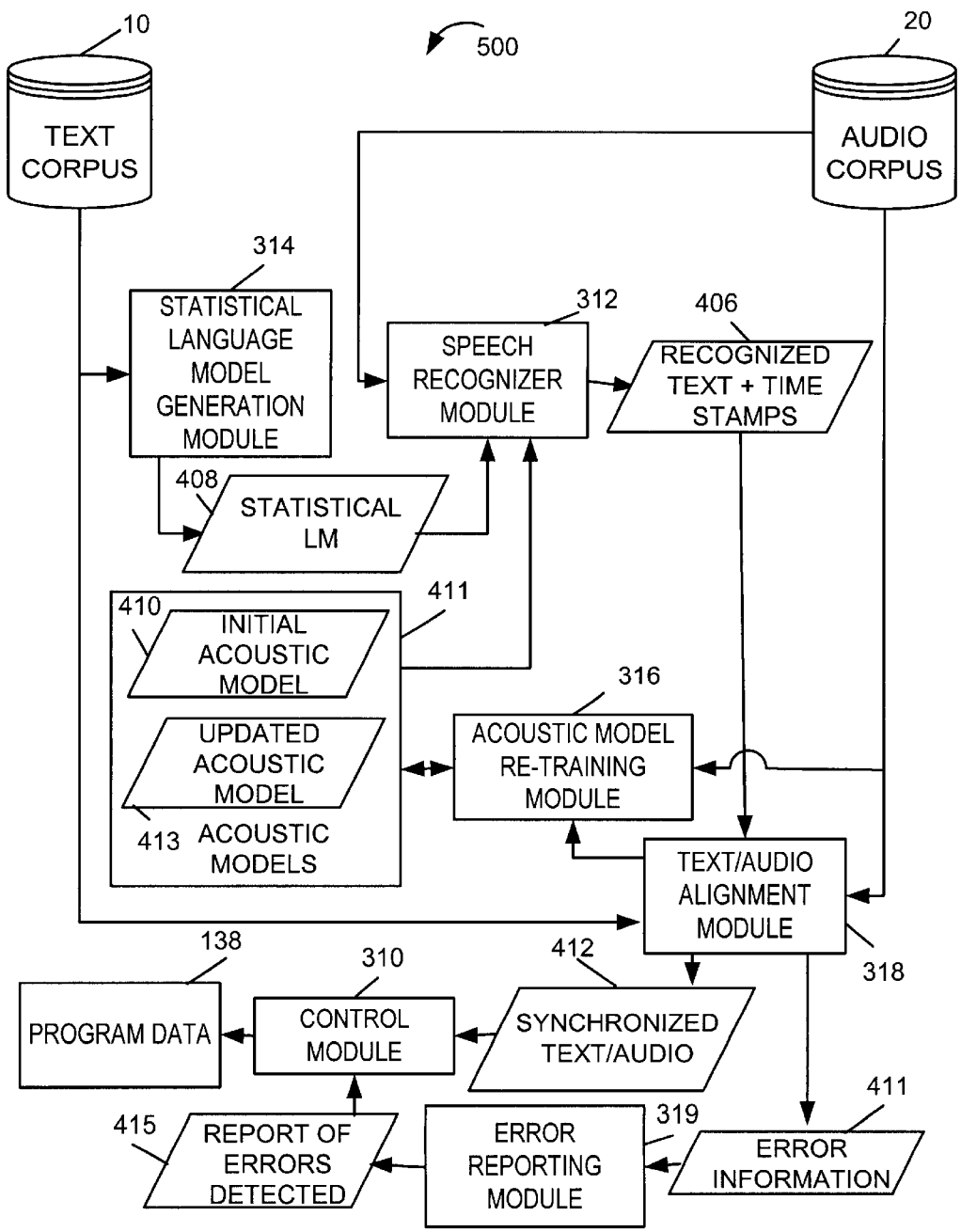

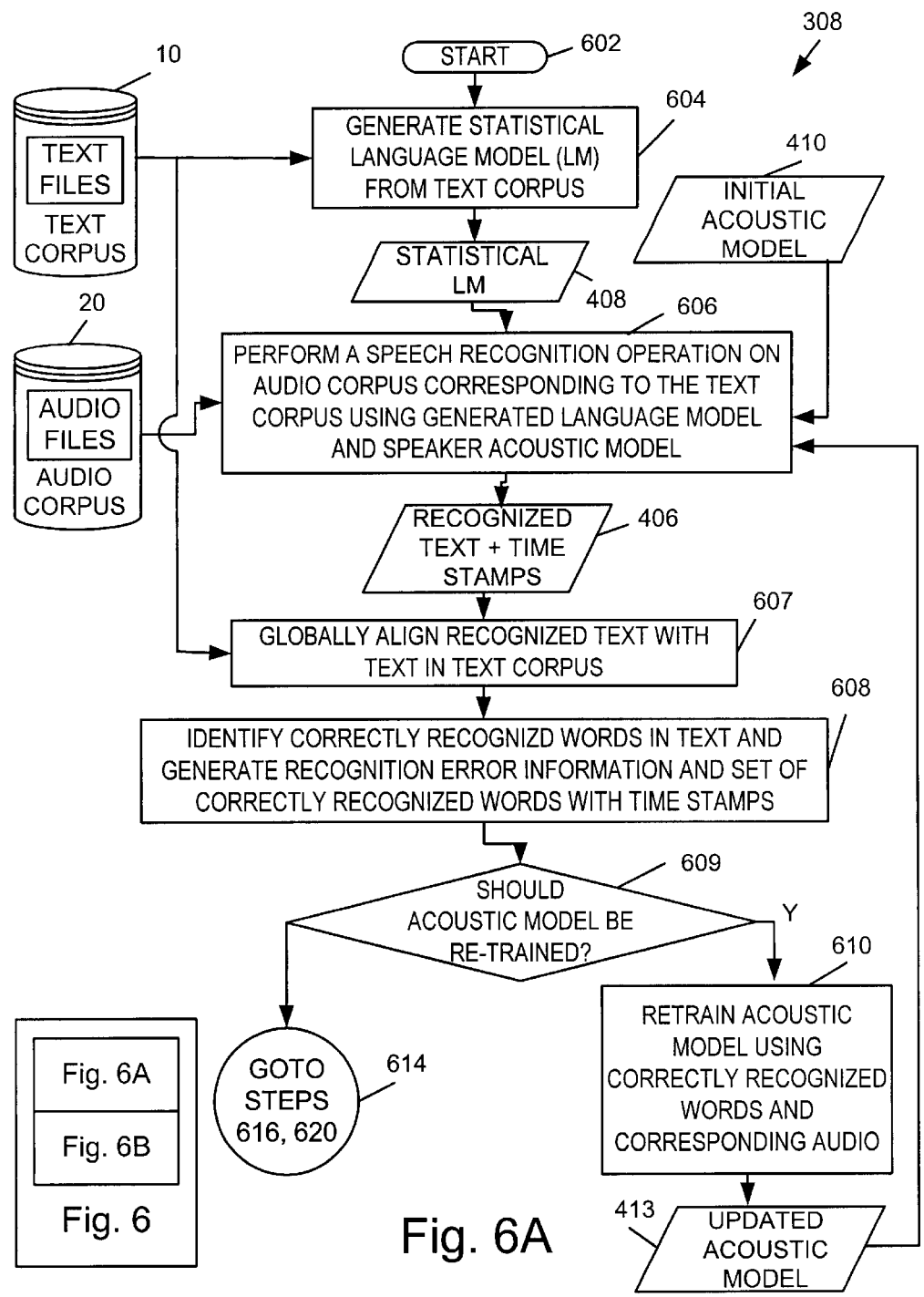

| CORRECTLY RECOGNIZED WORD | START | STOP |
|---|---|---|
| CALL | 12 | 48 |
| ME | 50 | 85 |
| JOHN | 90 | 109 |
| <SIL> | 110 | 117 |
| I | 118 | 125 |
| FOR | 144 | 156 |
| YOU | 157 | 169 |
| <SIL> | 170 | 185 |

METHODS AND APPARATUS FOR PERFORMING SPEECH RECOGNITION USING ACOUSTIC MODELS WHICH ARE IMPROVED THROUGH AN INTERACTIVE PROCESS

FIELD OF THE INVENTION

The present invention relates to methods and apparatus for performing speech recognition and for using the results of a speech recognition operation to synchronize electronic audio and text data, and/or provide information relating to the accuracy and/or understandability of audio versions of a work also available in text form.

BACKGROUND OF THE INVENTION

Historically, books and other literary works have been expressed in the form of text. Given the growing use of computers, text is now frequently represented and stored in electronic form, e.g., in the form of text files. Accordingly, in the modern age, users of computer devices can obtain electronic copies of books and other literary works.

Frequently text is read aloud so that the content of the text can be provided to one or more people in an oral, as opposed to written, form. The reading of stories to children and the reading of text to the physically impaired are common examples where text is read aloud. The commercial distribution of literary works in both electronic and audio versions has been commonplace for a significant period of time. The widespread availability of personal computers and other computer devices capable of displaying text and playing audio files stored in electronic form has begun to change the way in which text versions of literary works and their audio counterparts are distributed.

Electronic distribution of books and other literary works in the form of electronic text and audio files can now be accomplished via compact discs and/or the Internet. Electronic versions of literary works in both text and audio versions can now be distributed far more cheaply than paper copies. While the relatively low cost of distributing electronic versions of a literary work provide authors and distributors an incentive for distributing literary works in electronic form, consumers can benefit from having such works in electronic form as well.

In the case of recordings of literary and other text documents which are read aloud and recorded for commercial purposes, a single reader is often responsible for the reading of the entire text. The reader is often carefully chosen by the company producing the audio version of the literary work for proper pronunciation, inflection, general understandability and overall accuracy. In addition, audio recordings of books and other literary works are normally generated in a sound controlled environment designed to keep background noise to a minimum. Thus commercial audio versions of books or other literary works intended to be offered for sale, either alone or in combination with a text copy, are often of reasonably good quality with a minimum of background noise. Furthermore, they tend to accurately reflect the punctuation in the original work and, in the case of commercial audio versions of literary works, a single individual may be responsible for the audio versions of several books or stories since commercial production companies tend to use the same reader to produce the audio versions of multiple literary works, e.g., books.

Consumers may wish to switch between audio and text versions of a literary work. For example, in the evening an individual may wish to read a book. However, on their way to work, the same individual may want to listen to the same version of the literary work from the point, e.g., sentence or paragraph, where they left off reading the night before. Consumers attempting to improve their reading skills can also find text and audio versions in the form of electronic files beneficial. For example, an individual attempting to improve his/her reading skills may wish to listen to the audio version of a book while having text corresponding to the audio being presented highlighted on a display device. Also, many vision-impaired or hearing-impaired readers might benefit from having linked audio and text versions of a literary work.

While electronic text and audio versions of many literary works exist, relatively few of these works include links between the audio and text versions needed to support the easy accessing of the same point in both versions of a work. Without such links between the text and audio versions of a work, it is difficult to easily switch between the two versions of the work or to highlight text corresponding to the portion of the audio version being played at a given moment in time.

Links or indexes used to synchronize audio and text versions of the same work may be manually generated via human intervention. However, such human involvement can be costly and time consuming. Accordingly, there is a need for methods and apparatus for automating the synchronization of electronic text and audio versions of a work.

Previous attempts to automate the synchronization of electronic text files and audio files of the same work have focused primarily on the indexing of audio files corresponding to radio and other broadcasts with electronic text files representing transcripts of the broadcasts. Such indexing is designed to allow an individual viewing an excerpt from a transcript over the Internet to hear an audio clip corresponding to the excerpt. In such applications, the precision required in the alignment is often considered not to be critical and an error in alignment of up to 2 seconds is considered by some to be acceptable.

Once particular known attempt at synchronizing audio files with text transcripts of programs relies on the use of an iterative speech recognition and text alignment process. In the known system, both a language model and an acoustic model are used for speech recognition purposes. During each iteration of the speech recognition and alignment process, the results of the speech recognition process are used to segment the audio and text files at points where the files are aligned based on the recognition results. During each subsequent iteration of the speech recognition process, each audio and corresponding text segment is processed separately thereby reducing the size of the segments being processed. While the acoustic model is not altered during each iteration of the speech recognition process in the known system, the language model is made more restrictive during each iteration so that only those words in the corresponding text segment are considered as words which may be recognized. Thus, the known system attempts to break the text/audio alignment process into steps of aligning smaller and smaller segments using ever more restrictive language models without attempting to improve or modify the acoustic model being used.

In the case of attempting to synchronize text and audio versions of literary works, given the above discussed uses of such files, accurately synchronizing the starting points of paragraphs and sentences is often more important than being able to synchronize individual words within sentences.

In view of the above discussion, it is apparent that there is a need for new methods and apparatus which can be used to accurately synchronize audio and text files. It is desirable that at least some methods and apparatus be well suited for synchronizing text and audio versions of literary works. It is also desirable that the methods and apparatus be capable of synchronizing the starting points of sentences and/or paragraphs in audio and text files with a high degree of accuracy.

To the extent that methods and/or apparatus for synchronizing audio and text files involves the use of speech recognition, there is also a need for speech recognition methods and apparatus which are well suited to use in an audio/text file synchronization process.

SUMMARY OF THE PRESENT INVENTION

The present invention is directed to methods and apparatus for performing speech recognition on audio data for which corresponding text data exists. It is also directed to methods and apparatus for using the results of a speech recognition operation to synchronize electronic audio and text data corresponding to the same work, e.g., book or program. It is also directed to methods and apparatus for generating and providing information relating to the accuracy and/or understandability of audio versions of a work which is also available in text form.

In accordance with the present invention, a speech recognition operation is performed on audio data representing an audio corpus for which a corresponding set of text data, e.g., a text corpus exists. The goal of the speech recognition operation is to recognize actual words and periods of silence in the audio data. As part of the speech recognition operation, an acoustic model is used in conjunction with a language model. The acoustic model used to perform an initial speech recognition operation on the audio data is a speaker independent acoustic model which was trained using a large set of training data from many different speakers many of whom have different pronunciation characteristics.

For speech recognition purposes, silence is modeled as a word. A time indexed set of recognized words and periods of silence is produced by the initial speech recognition operation. The results of the initial speech recognition operation are globally aligned with the text corpus by matching as much of the recognized text as possible to the corresponding text of the work without changing the sequence of the recognized or actual text.

The output of the initial speech recognition operation is compared to the aligned text of the work to determine which words in the audio corpus were properly recognized. Audio segments corresponding to properly recognized words are then extracted from the audio corpus through use of the time stamps associated with the recognized words.

The extracted audio segment corresponding to each correctly identified word, along with the word in text form, is supplied to an acoustic model training circuit. The training circuit is used to produce a new acoustic model trained using at least some of the actual speech in the audio corpus. In this manner the acoustic model is trained so that it will more accurately reflect the speech and pronunciation characteristics of the speaker or speakers who are responsible for the content of the audio corpus.

The retrained acoustic model is used to perform a speech recognition operation on the audio corpus. The results of the speech recognition operation are then aligned with the content of the text corpus and a determination is made as to which words and/or periods of silence were correctly recognized. The results of the additional speech recognition operation may be used to retrain the acoustic model yet again in the hopes of improving recognition results.

Iterative speech recognition and retraining operations are performed to improve the acoustic model used for speech recognition purposes until recognition results cease to improve or some other stop criterion are reached.

With the completion of the improvement in the acoustic model, speech recognition results produced using the improved acoustic model are used to synchronize the audio and text versions of the same work.

In accordance with an exemplary embodiment of the present invention, bi-directional pointers between the audio and text files representing a work are inserted into the text file at locations corresponding to positions in the audio file which are bracketed by correctly identified words. That is, pointers are inserted at the start of the second word in a pair of correctly identified words and/or at points of silence surrounded by correctly identified words.

In addition, to using the speech recognition results produced using the re-trained acoustic model for file synchronization purposes, the speech recognition results are used to detect errors in the audio version of the work, e.g., omissions of words included in the text and/or the additions of words not found in the text.

As discussed above, a single reader may be responsible for producing the audio versions of multiple literary works. In addition, readers selected for producing commercial versions of literary works often share similar pronunciation characteristics. Accordingly, one feature of the present invention is directed to the use of the improved acoustic model generated by processing the audio and text versions of one work, when performing the initial speech recognition operation of another, e.g., different literary work, by the same or a different reader.

The automated detection of errors and/or inconsistencies between audio and text versions of a work, generated in accordance with the present invention, can be used to provide a measure of a reader's accuracy and/or understandability. Such information can be used by publishing companies when evaluating and comparing the accuracy and/or understandability of different readers who may be used for producing audio versions of literary works.

Numerous additional features and advantages of the present invention will be discussed in the detailed description which follows.

BRIEF DESCRIPTION OF THE DRAWINGS

FIG. 5 illustrates the flow of data and information between various modules of the present invention.

FIG. 8 illustrates a set of correctly recognized text with time stamps generated in accordance with the present invention.

DETAILED DESCRIPTION

As discussed above, the present invention is directed to methods and apparatus for performing speech recognition and for using the results of a speech recognition operation to synchronize electronic audio and text data, and/or provide information relating to the accuracy and/or understandability of audio versions of a work also available in text form.

Figure 1:
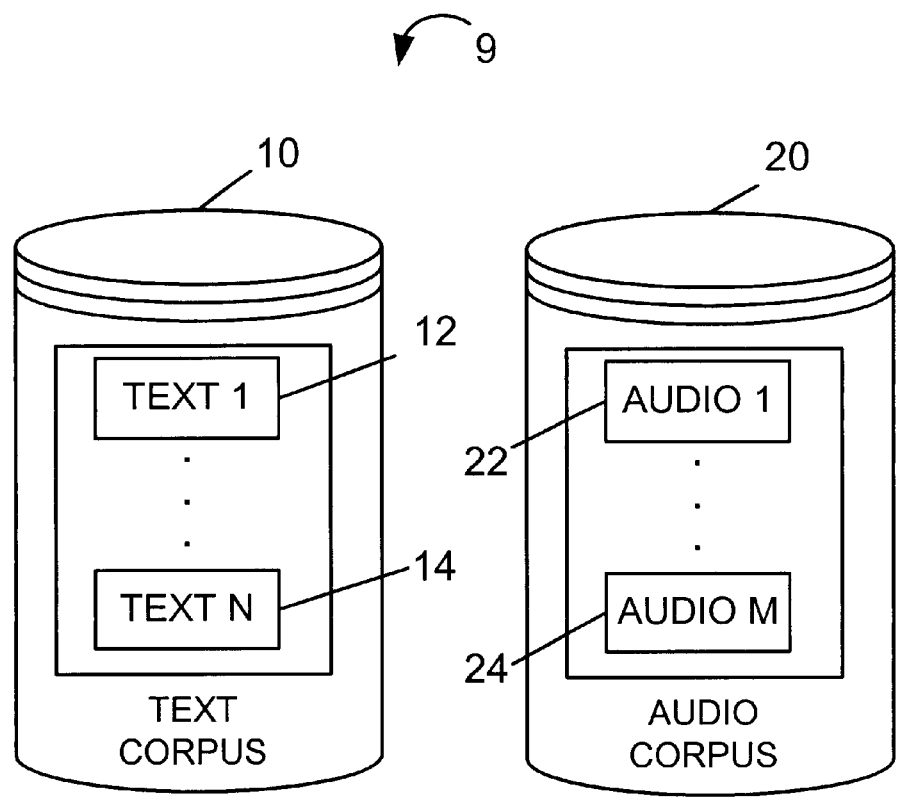
FIG. 1 illustrates unsynchronized electronic text and audio corpuses corresponding to the same exemplary literary work.

FIG. 1 illustrates a set 9 of unsynchronized text and audio files corresponding to, e.g., the same exemplary literary work. A plurality of N text files 12, 14 form a text corpus 10 which represents the complete text of the exemplary literary work. Text files 12, 14 may be in any one of a plurality of electronic formats, e.g., an ASCII format, used to store text information. A plurality of M audio files 22, 24 form an audio corpus 20 which represents a complete audio version of the exemplary work. Audio files 22, 24 may be in the form of WAVE or other electronic audio file formats used to store speech, music and/or other audio signals. Note that the number N of text files which form the text corpus 10 may be different than the number M of audio files which form the audio corpus 20.

While the text corpus 10 and audio corpus 20 correspond to the same literary work, the audio and text files are unsynchronized, that is, there are no links or reference points in the files which can be used to correlate the informational content of the two files. Thus, it is not possible to easily access a point in the audio corpus 10 which corresponds to the same point in the literary work as a point in the text corpus 20. This makes it difficult to access the same location in the literary work when switching between text and audio modes of presenting the literary work.

Figure 2:
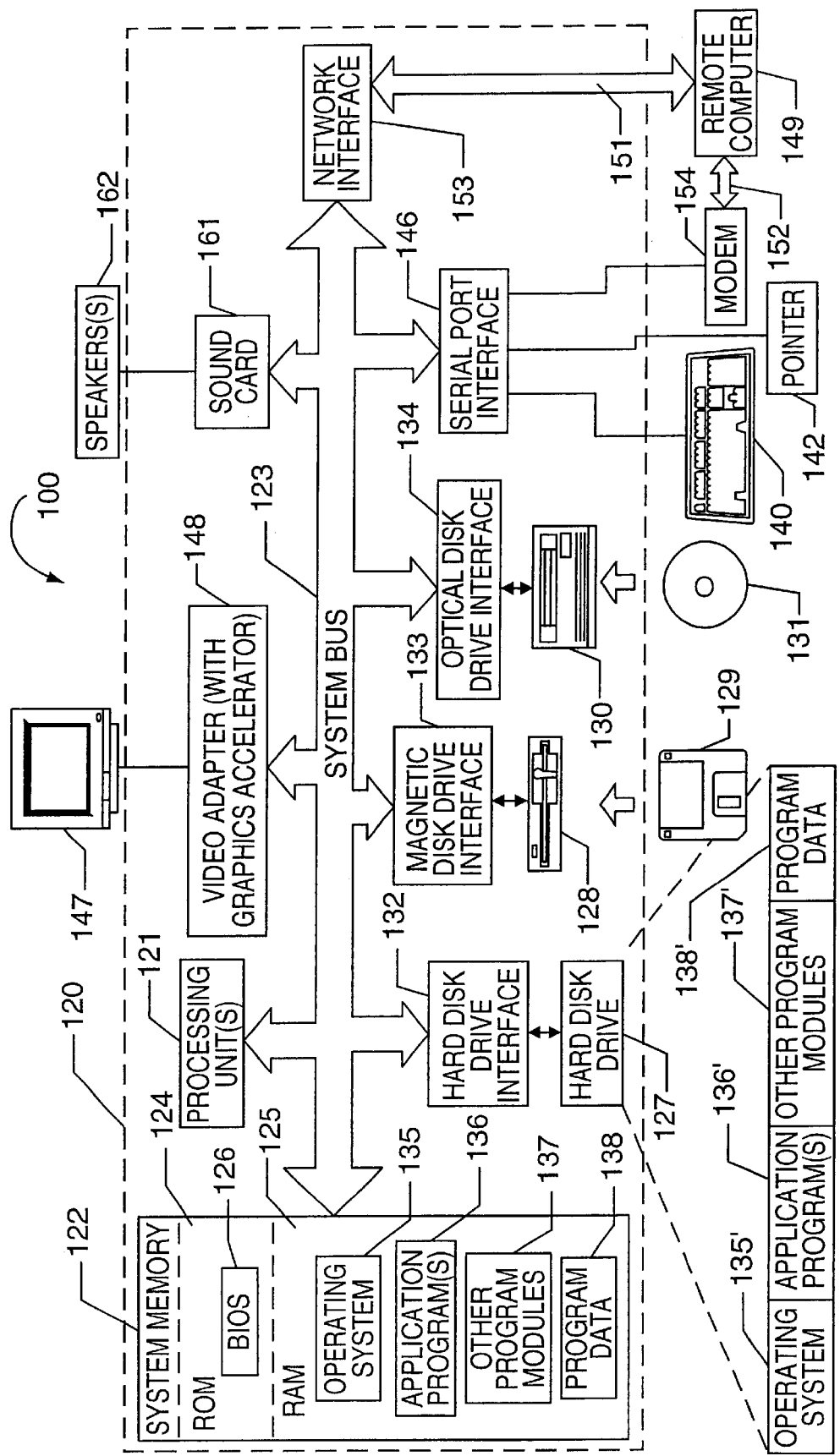
FIG. 2 illustrates a computer system implemented in accordance with one embodiment of the present invention.

FIG. 2 and the following discussion provide a brief, general description of an exemplary apparatus, e.g., computer system, in which at least some aspects of the present invention may be implemented. The computer system may be implemented as a portable device, e.g., notebook computer or a device for presenting books or other literary works stored in electronic form.

The present invention will be described in the general context of computer-executable instructions, such as program modules, being executed by a personal computer. However, the methods of the present invention may be effected by other apparatus. Program modules may include applications, routines, programs, objects, components, data structures, etc. that perform a task(s) or implement particular abstract data types. Moreover, those skilled in the art will appreciate that at least some aspects of the present invention may be practiced with other configurations, including handheld devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 2, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an (magneto-) optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile storage of machine readable instructions, data structures, program modules and other data for the personal computer 120. Although the exemplary environment described herein employs a hard disk, a removable magnetic disk 129 and a removable (magneto) optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125. In FIG. 2 such as an operating system 135, one (1) or more application programs 136, other program modules 137, and/or program data 138 are shown as being stored in RAM 125. Operating system 135', application program(s) 136', other program modules 137' and program data 138' are shown as being stored on hard disk driver 127. As will be discussed below in regard to FIG. 3, in the exemplary embodiment the application programs include an audio/text synchronization program implemented in accordance with the present invention. In addition, program data 138 described in further detail with regard to FIG. 4, includes an acoustic model and other data used by the audio/text synchronization program 308 of the present invention.

A user may enter commands and information into the personal computer 120 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USE). A monitor 147 or other type of display device may also be connected to the system bus 123 via an interface, such as a video adapter 148 for example. In addition to the monitor, the personal computer 120 may include a sound card 161 coupled to speaker(s) 162 and other peripheral output devices (not shown), such as printers for example.

The personal computer 120 may operate in a networked environment which defines logical connections to one (1) or more remote computers, such as a remote computer 149. The remote computer 149 may be another personal computer, a server, a router, a network PC, a peer device or other common network node, and may include many or all of the elements described above relative to the personal computer 120. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in a remote memory storage device. The network connections shown are exemplary and other means of establishing a communications link between the computers may be used.

Figure 3:
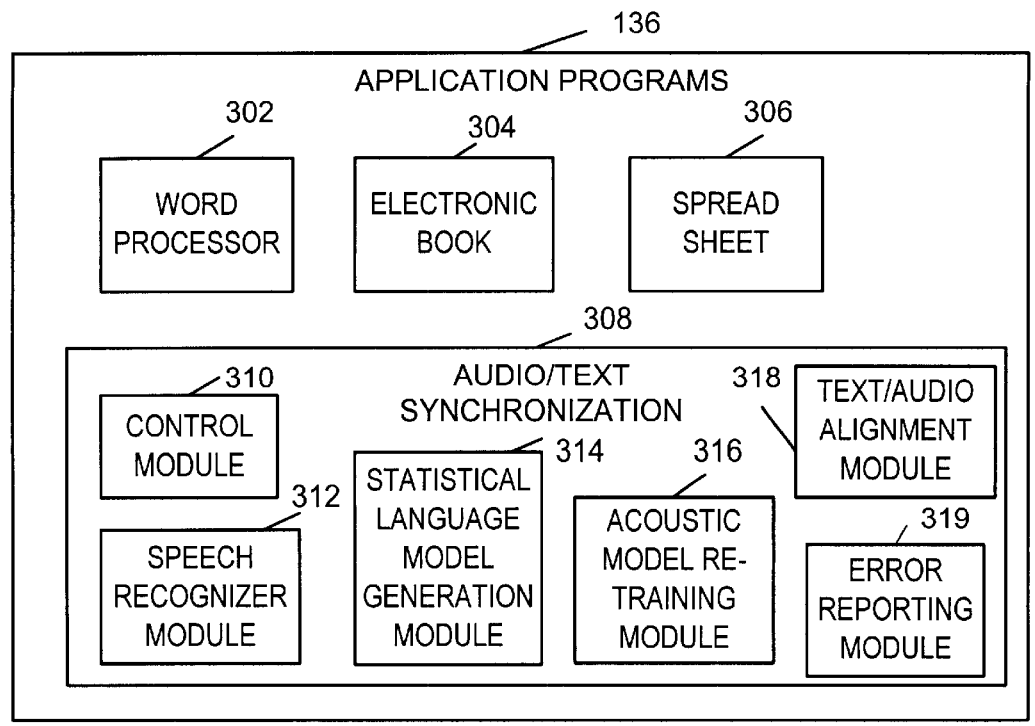
FIG. 3 illustrates a set of application programs included in the computer system of FIG. 2.

FIG. 3 illustrates the set of application programs 136 stored in the memory 125 in greater detail. As illustrated, the application programs 136 include a word processor program 302, an electronic book program 304, a spread sheet program 306 and an audio/text synchronization program 308 of the present invention. The electronic book program 304 is capable of accessing and presenting the content of audio and/or text files to the user of the computer system 120. In the case of synchronized text and audio files, the computer system 120 can switch between audio and text presentation modes or simultaneously provide audio corresponding to text being displayed.

The audio/text synchronization program 308 of the present invention can be used to generate synchronized audio and text files from unsynchronized audio and text files corresponding to the same informational content. For example, the audio/text synchronization program 308 can be used to generate synchronized audio and/or text versions of a literary work from unsynchronized audio and text versions of the work.

The audio/text synchronization program 308 of the present invention includes a plurality of modules which are used to generate the synchronized audio and/or text files from unsynchronized audio and text files. The modules include a control module 310, a speech recognizer module 312, a language model generation module 314, acoustic model re-training module 316, error reporting module 319, and text/audio alignment module 318. The control module 310 is responsible for controlling the interaction of the various other modules which comprise the audio/text synchronization program 136 and is responsible for controlling the accessing and storage of audio and text files. The speech recognizer module 312 is used for performing speech recognition, as a function of a language model and an acoustic model. By performing a speech recognition operation, the speech recognizer module 312 generates a set of recognized text with time stamps from one or more audio files. The language model generation module 314 is used for generating, from a text corpus, a language model used by the speech recognizer 312. The acoustic model re-training module 316 is responsible for generating an updated acoustic model to be used during one or more iterative speech recognition operations performed on the same audio corpus. As will be discussed below, the acoustic model re-training module uses results from a previous speech recognition operation to re-train the acoustic model being used for speech recognition purposes.

The text/audio alignment module 318 is responsible for performing a number of functions. It is responsible for globally aligning recognized text with text in the text corpus 10. It is also responsible for generating training data, e.g., a set of correctly identified words and corresponding audio time stamps, and for controlling the iterative process of updating the acoustic model through the use of the re-training module and generated training data. After updating of the acoustic model is completed, the text/audio alignment module is responsible for identifying points in the audio and text files where pointers should be added to the text and/or audio files for synchronization purposes. The alignment module 318 is also responsible for aligning the audio and text files based on the identified alignment points, e.g., by inserting into the text and/or audio files time stamps or other markers which can be used as pointers between the audio and text files.

Figure 4:
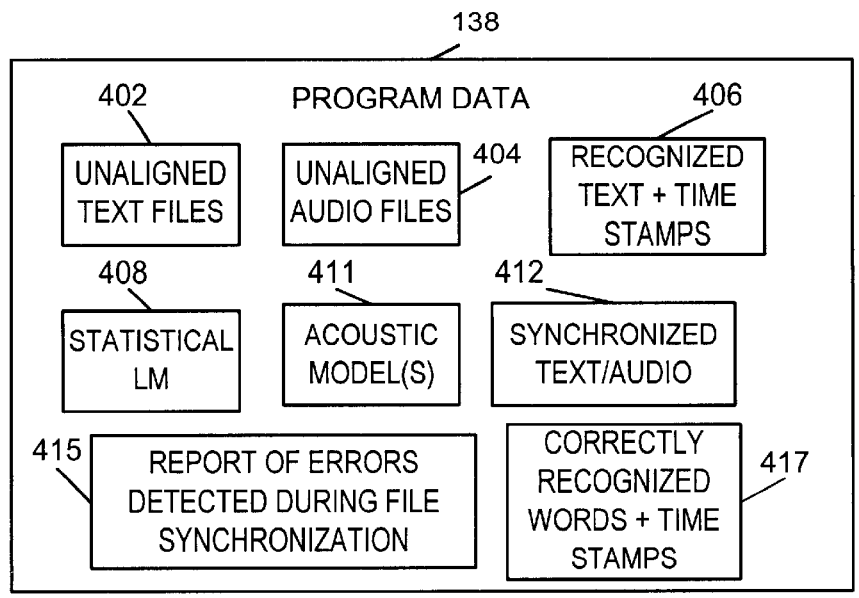
FIG. 4 illustrates a set of program data included in the computer system of FIG. 2.

FIG. 4 illustrates various sets of program data 138 used by the audio/text synchronization program 308 of the present invention. As illustrated, the program data 138 includes unaligned text files 402 which may include text files 12, 14. The program data 138 also includes unaligned audio files 404 which may include audio files 22, 24. The program data 130 also includes acoustic models 411. As will be discussed below, the models 411 may include an initial speaker independent acoustic model 410 and one or more speaker trained acoustic models 413 (see FIG. 5). A statistical language model 408, recognized text with time stamps 406, and synchronized text/audio files which are generated by the audio/text synchronization program 308 are also included in program data 138. The program data may also include a report 415 of errors detected during file synchronization and a set 417 which may be used as re-training data during re-training of the acoustic model.

Acoustic model 410, 413 and the language model 408 play an important role in the synchronization process of the present invention. The language model 408 is generated by the statistical language model generation module 314 in such a manner, e.g., as a finite state network, so as to allow it to be combined with the acoustic model 410 or 413 in a straight forward manner for speech recognition purposes.

An acoustic model from the stored acoustic models 411 and the language model 408 are used to provide separate probabilities, which when combined, e.g., multiplied together, provide a joint probability that is used to determine the overall probability given an input acoustic sequence, that the sequence includes a particular hypothesized word or string of words. For a general discussion of the generation and use of acoustic models and language models in speech recognition applications see Lawrence Rabiner, Biing-Hwang Juang, *Fundamentals of Speech Recognition*, pp. 434–460 (Prentice Hall 1993).

The acoustic model estimates the probability, $P(Y/W)$, of a sequence of acoustic observations Y, conditioned on a hypothesized word string W. Silence may be modeled as a word.

The language model 314, is used to estimate the probability $P(W)$ associated with a hypothesized sequence of words (W). The language model can incorporate syntactic and/or semantic constraints. In the exemplary embodiment, the language model is generated using syntactic constraints in the form of an N-gram (N>1) word model where, in the exemplary embodiment N=3 resulting in tri-gram word models. N-gram word models are based on the statistical probability that a hypothesized word will occur based on the preceding (N−1) recognized words.

Unlike simple models, such as word pair models, which are simply a set of possible word pairs, statistical models can provide a more reliable recognition result given that they take into consideration more information than word pair models. Accordingly, when attempting to determine if a particular word sequence has occurred, e.g., for purposes of synchronizing audio and text files in accordance with the present invention, the recognition results of statistical models can be more reliable and useful than those of simple word pair models.

The language model constrains the possible words which may be recognized. In this way, it limits the words which are considered during speech recognition for hypothesis purposes to those which are possible in a given language or context. In the context of performing speech recognition on an audio corpus corresponding to a text corpus, it is useful to generate the language model 408 so that only those words found in the corresponding text corpus are potential candidates for recognition purposes. Accordingly, when synchronizing text and audio corpuses, in accordance with the invention, the language model 408 is generated from the text corpus being synchronized. Thus, words outside the text corpus are not considered as potential candidates for speech recognition purposes.

The flow of data and information between various modules of the present invention will now be discussed with reference to the flow chart 500 of FIG. 5. While program modules implemented using software are shown, it is to be understood that one, several, or all of the illustrated modules may be replaced with one or more dedicated hardware circuits which perform the same or similar functions as the illustrated modules. Accordingly, the present invention encompasses an embodiment wherein dedicated hardware circuits are used in place of each of the modules illustrated in FIG. 5.

The relationship between the various program modules which comprise the audio/text synchronization program 308, and the data used or generated by the program 308, will now be discussed.

As illustrated in FIG. 5, the corpus 10 of electronic text files, for which there is a corresponding corpus 20 of audio files, is supplied to the statistical language model generation module 314. Statistical language model generation module 314 is responsible for generating the statistical language model 408. The generated statistical language model 408 is supplied along with acoustic model 410 or 413 to the speech recognizer model 312. The speech recognizer module 312, generates from the audio corpus 20 a set 406 of recognized text which includes time stamps indicating the location within the audio corpus of the audio segment which corresponds to a recognized word.

The recognized text with time stamps, text corpus and audio corpus are then processed by the text/audio alignment module 318 to produce a set 412 of synchronized text and audio files and a set of error information 411. The error reporting module 319 formats the error information 411 into a report 415 prior to the error report 415 and set 412 of synchronized text and audio files being stored under control of the control module 310. The set 412 of synchronized text and audio files may take any one of a plurality of forms as will be discussed below in regard to FIGS. 10–13.

Prior to generating the set 412 of synchronized text and audio files 412, the text/audio alignment module 318 produces one or more set of correctly recognized words with time stamps which are used as training data by the acoustic model re-training module 316. The acoustic model re-training module 316 generates an updated acoustic model using the training data received for the text alignment module 318. By training the updated acoustic model using words and speech recognized during a preceding speech recognition operation performed on a portion of the same audio corpus, an initial speaker independent speech recognition model is replaced with an updated speaker trained acoustic model. The speaker trained acoustic model can provide improved recognition results when used to perform a subsequent speech recognition operation on the same audio corpus or on a different audio corpus including speech produced by the same speaker or a speaker with similar pronunciation characteristics.

Figure 6B:
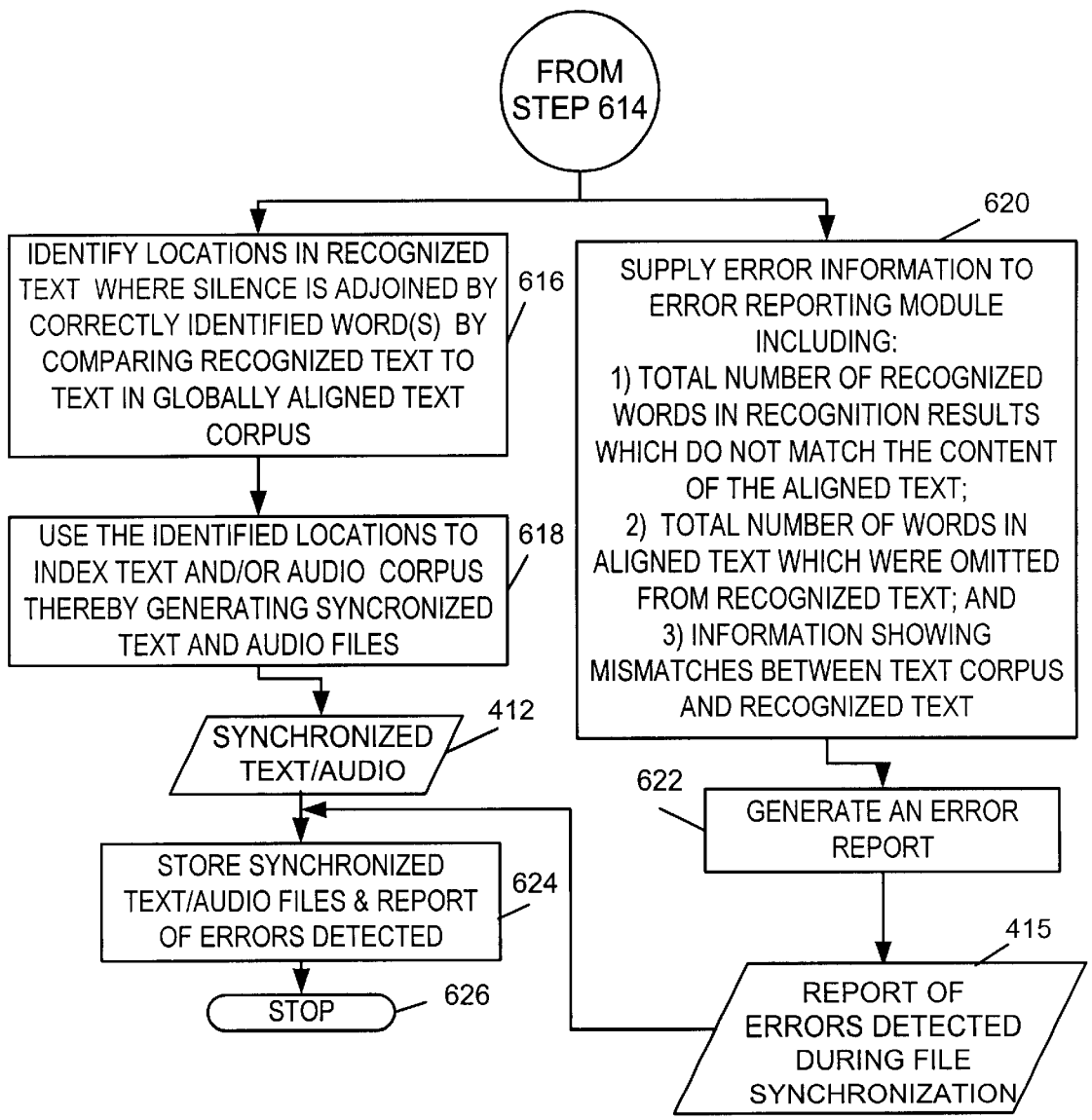
FIG. 6, which comprises the combination of FIGS. 6A and 6B, is a flow diagram illustrating the steps of the present invention involved in synchronizing text and audio files.

The various steps performed by the audio/text synchronization program 308 of the present invention will now be explained in detail with reference to the flow chart of FIG. 6 which comprises the combination of FIGS. 6A and 6B. Program 308 begins in step 602 wherein it is executed by the processor 121. Then in step 604, a statistical language model 408 is generated from the file or files which comprise the text corpus 10. As discussed above, the language model 408 may be generated using any one of a plurality of known techniques using language model generation module 314. In one particular exemplary embodiment, the language model 408 is a tri-gram language model.

From step 604 operation proceeds to step 606, wherein a speech recognition operation is performed on the audio corpus 20. The speech recognition operation is performed by speech recognizer module 312 which uses the statistical language model 408 and an acoustic model 410. The first time a speech recognition operation is performed on the audio corpus 20, the initial acoustic model 410 is used. The initial acoustic model 410 is a speaker independent acoustic model. During subsequent iterations of step 606, the updated acoustic model 413 is used.

The result of performing a speech recognition operation in step 606 is the set of recognized text with time stamps 406. The time stamps serve as an index into the audio corpus 20 and mark the distance in playback time from the start of the audio corpus to the point being identified by the time stamp. Both start and stop time stamps may be included with the recognized text to indicate beginning and ending points of an audio segment which corresponds to a recognized word.

Figure 7:
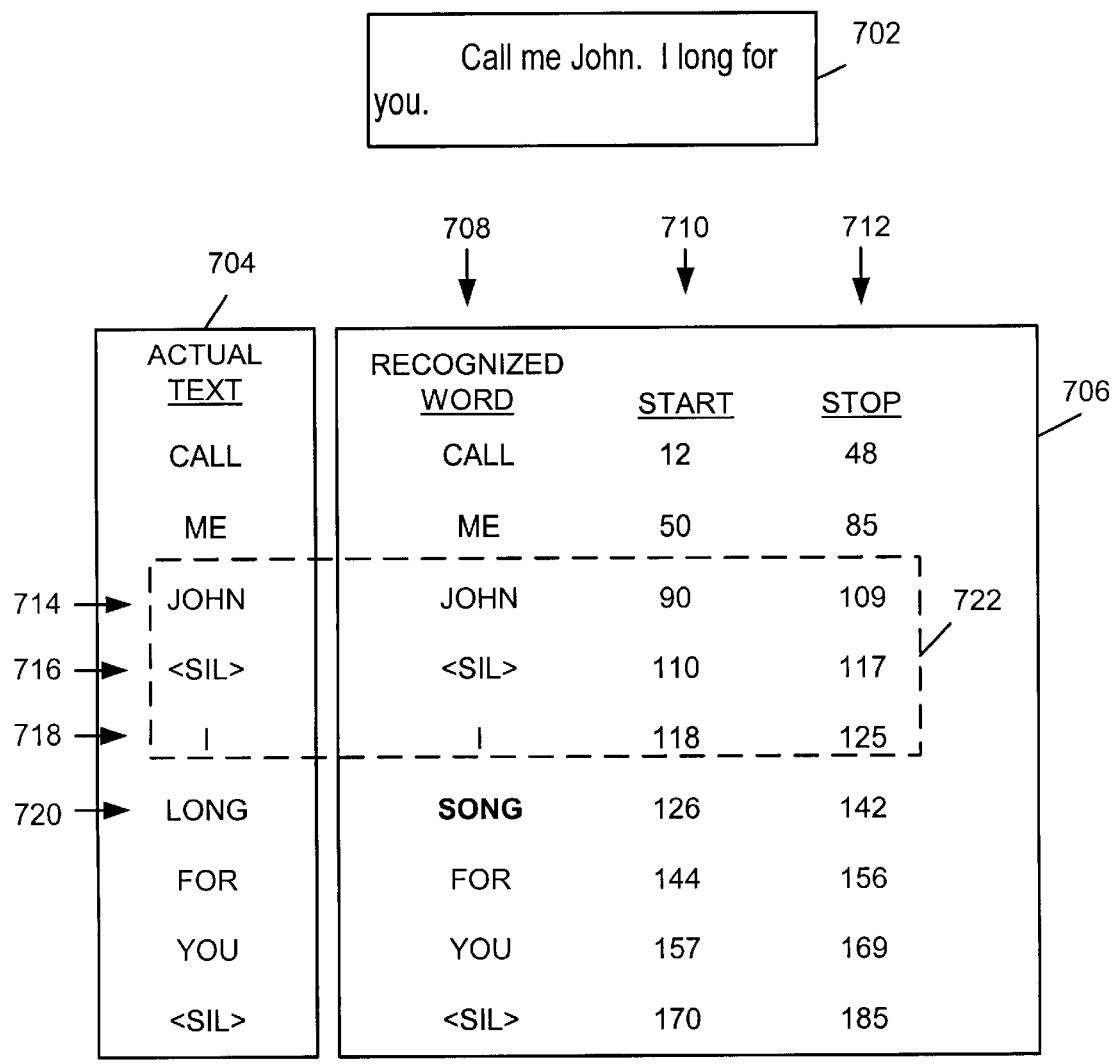
FIG. 7 illustrates an exemplary text corpus and the global alignment of the content of the text corpus with recognized speech.

Block 706 of FIG. 7 represents an exemplary set 406 of recognized text with time stamps that may be generated by the speech recognition operation of step 606. In block 706, the recognized word is listed in the first column 708. The second and third columns 710, 712 of block 706 include the start and stop time stamps associated with each recognized word.

From step 606 of the audio/text synchronization program 308 operation proceeds to step 607 wherein the recognized text is aligned to the extent possible with the text in the text corpus. This may be accomplished by matching recognized words or sequences of recognized words in the recognized text to those found in the text corpus in such a manner that the number of matching words in the recognized text and text corpus is maximized while the sequence of the text is unaltered. One embodiment of this technique is the well-known optimization algorithm dynamic programming. Alternatively, other known alignment algorithms may be used to perform step 607.

In FIG. 7, text from an exemplary paragraph of a text corpus 10 is shown in block 702. Block 704 shows the actual text with <SIL> being substituted for punctuation, e.g., period, which would cause a speaker to insert silence in the text when read aloud. Placement of the recognized text 706 side by side with the actual text 704 represents the global alignment of the actual and recognized text performed in step 607. Rows 714, 716, 718 and 720 correspond to aligned words. Note that the actual text 704 is aligned with the recognized text 708 so that in the illustrated sequence only one miss-match occurs, i.e., the words in row 720, LONG, and SONG do not match. The mismatch in row 720 corresponds to a recognition error where the word song was mistakenly identified in place of the word long.

From global alignment step 607, operation proceeds to step 608 wherein correctly recognized words are identified, error information 411 is generated, and a set 417 of correctly recognized words with time stamps is produced.

In the example of the results shown in FIG. 7, in step 608 all the words but for the recognized word SONG would be identified as correctly recognized words. In this exemplary case, the error information 411 would indicate that one word was incorrectly recognized. The error information may also include the aligned word in the actual text, LONG, and the corresponding recognized word and time stamp information. In such an embodiment, the error information 411 would include the contents of row 720 with an indication that there was a recognition error.

Since all the words but for the word SONG match the aligned text in block 704, the set 417 of correctly identified words and time stamps would, in the FIG. 7 example, include all the information in block 706 but for the contents of row 720 where the error was detected. Such a set 417 of correctly identified words and time stamps is shown in FIG. 8.

Operation proceeds from step 608 to step 609 wherein a determination is made as to whether or not the acoustic model should be re-trained.

In accordance with the present invention, the acoustic model is normally retrained at least once each time a new set of text and audio corpuses 10, 20 are to be synchronized. Accordingly, if the initial acoustic model 410, as opposed to a retrained acoustic model 413 was used in step 606 to perform speech recognition, it is determined that the acoustic model should be retrained.

A variety of techniques may be used to determine whether or not to re-train the acoustic model after the first re-training operation. One technique is to determine if the previous retraining operation resulted in an increase in the recognition rate, that is, a decrease in the number of recognition errors. Accordingly, in one embodiment, is an updated acoustic model 413 was used in step 606, the number of recognition errors detected during the immediately preceding iteration of step 608 is compared to the number of errors detected during the current iteration of step 608. In such a case, if the current number of detected errors is lower than preceding detected number of recognition errors, a decision is made in step 609 to retrain the acoustic model. However, if the current number of detected errors is lower than preceding detected number of recognition errors, a decision is made in step 609 to retrain the acoustic model.

If a decision is made to retrain the acoustic model, operation proceeds to step 610 wherein the acoustic model is retrained using the correctly recognized words identified in step 608 and the acoustic model re-training module 316. The acoustic model re-training process of the present invention will be described in detail below in regard to FIG. 9 which illustrates an exemplary acoustic model retraining module 316 in detail.

The updated acoustic model 413, generated in step 610, is supplied as input to step 606 as operation proceeds from step 610 to step 606. When operation proceeds to step 606 via step 610, the updated acoustic model 413, as opposed to the initial acoustic model 410, is used to perform the speech recognition operation on the audio corpus 20.

If in step 609 it is determined that the acoustic model used in step 606 should not be re-trained, operation proceeds to steps 616 and 620 via GOTO step 614. The process paths which begin with step 616 and 620 are shown as occurring in parallel. However, the steps in these paths may be implemented sequentially if desired.

In step 620 locations in the recognized text where silence is preceded and/or followed by correctly recognized words are identified. As discussed above, in the case of audio versions of literary works and other works read allowed and recorded for commercial distribution purposes, silence is often particularly easy to recognize. This is because the recordings are often made in a sound studio with limited background noise. As discussed above, silence normally occurs at the ends of sentences and paragraphs, and it is these points which are of particular interest for the insertion of pointers for the purposes of text and audio synchronization. Thus, identifying points where silence occurs as potential locations where a pointer may be inserted can be particularly useful when synchronizing audio and text files.

In one particular exemplary embodiment, for a pointer to be inserted into the text and/or audio for synchronization purposes, the recognized text, bracketing the identified point of silence must have been correctly identified. In other words, in the particular embodiment both the word preceding and subsequent to the period of silence must have been correctly recognized.

In row 716 of FIG. 7, it can be seen that a period of silence was recognized in the audio file starting at time stamp 110 and ending at time stamp 117. By comparing the recognized word JOHN preceding the recognized silence, to the word preceding the silence in the aligned actual text 704, it can be seen that the word JOHN was correctly recognized. By comparing the recognized word I, following the recognized silence, to the word following the silence in the aligned text 704, it can be seen that the word I was also correctly recognized. Since the words preceding and following the silence were correctly recognized, the silence defined by audio time stamps 110, 117 would be identified in step 616 as a point where the audio and text files should be synchronized.

This can be done by, e.g., adding a bi-directional pointer linking the text and audio files, to the text files, and, optionally, to the audio files. By adding a pointer at the identified aligned location corresponding to silence, in this case the audio and text files will be synchronized at the start of a sentence.

In the particular exemplary embodiment described above where both words bracketing silence must be correctly recognized for the point of silence to be used for file synchronization purposes, if silence was recognized adjacent the miss-recognized word, SONG, the recognized silence would not be identified in step 608 for synchronization purposes.

From step 616 where points suitable for file synchronization purposes are identified, operation proceeds to step 618, wherein the locations identified in step 616 are used to index the text and/or audio corpus. The indexing of the files may be performed in a plurality of ways.

One way to index the audio and text files is to add audio time stamps to the corresponding identified locations in the text file, e.g., the points where the punctuation corresponding to the identified periods of silence are located. Such time stamp values may identify the position from the start of the audio file where the detected silence being indexed starts or stops. Thus, in accordance with the present invention audio time stamps or other pointers into an audio file may also be inserted in a text file for synchronization purposes. If the audio file does not already include such time stamps, they may be inserted into the corresponding audio file to facilitate file synchronization as well. Incorporation of audio time stamps into the audio file is optional since these may be calculated on the fly from the audio file in a relatively short amount of time. By incorporating audio time stamps into the text and, optionally, the corresponding audio file, accessing the same point in both the audio and text versions becomes a simple matter of searching the text and/or audio file for a particular, e.g., corresponding, audio time stamp.

The synchronized text and audio files 412 generated in step 618 may take any one of several forms as will be discussed below in regard to FIGS. 10–13. After the set 412 of synchronized audio and text files is generated, operation proceeds to step 624.

Steps 620 and 622, which may be performed in parallel with steps 616, 618, involve the generation of a report of errors which are detected as part of the automated file synchronization process of the present invention. In step 620, error information generated by the text/audio alignment module 318 is supplied to error reporting module 319. The error information includes: 1) the total number of recognized words in the last set of speech recognition results which do not match the content of the aligned text; 2) the total number of words in the aligned text which were omitted from the recognized text and 3) information showing mismatches between the content of the text corpus and the recognized text.

From step 620, operation proceeds to step 622 wherein the error reporting module 622 generates an error report 415 including the error information which was supplied in step 620. Then operation proceeds to step 624.

In step 624 the synchronized text and audio files 412 are stored in memory along with the generated report of detected errors 415. Storage of these files and report are performed under direction of the control module 310.

With the storing of the synchronized set 412 of audio and text files, the audio/text synchronization program 338 is stopped in step 626 pending its re-execution to process another set of unsynchronized audio and text corpuses.

Figure 9:
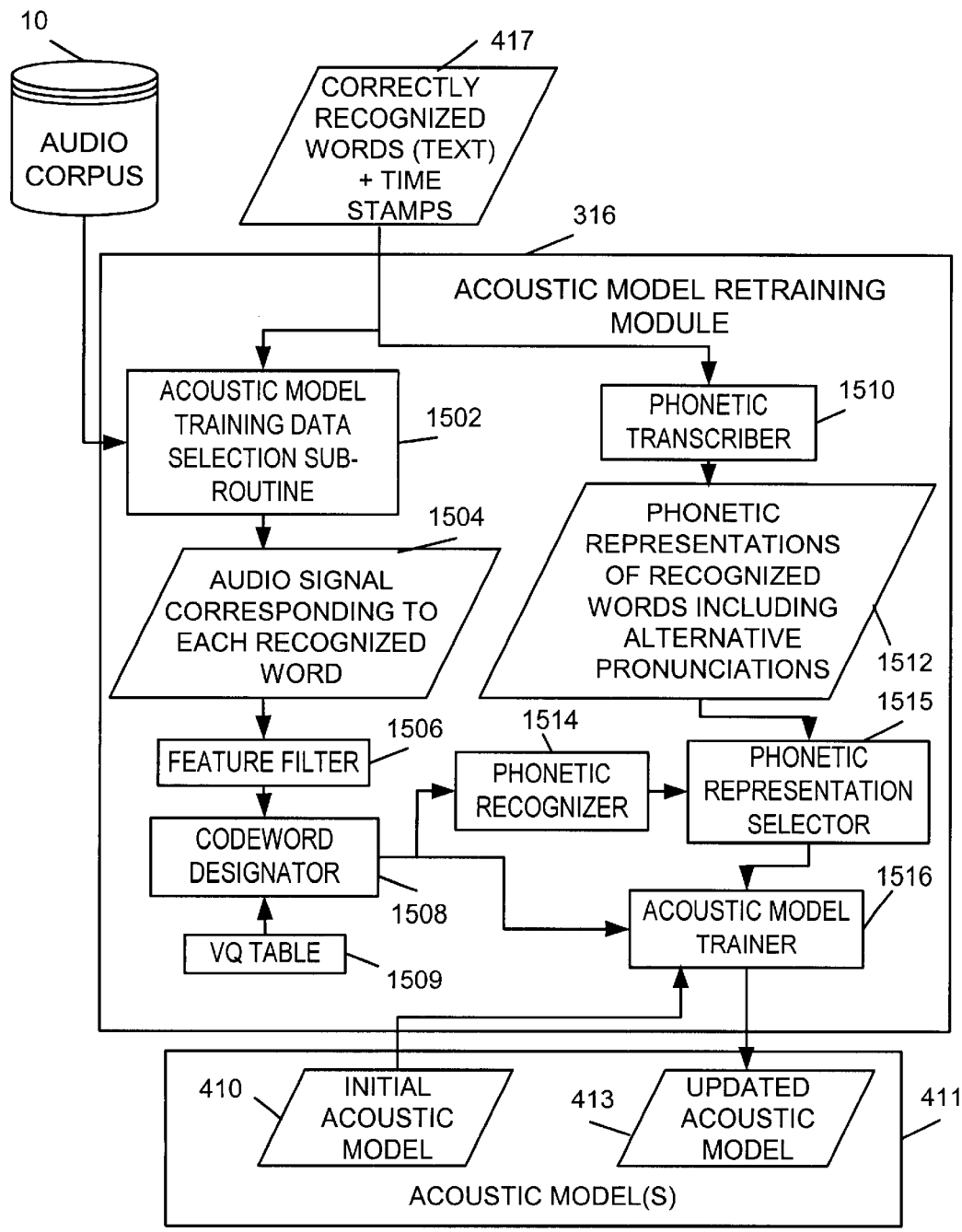
FIG. 9 illustrates an acoustic model retraining module implemented in accordance with the present invention.

The acoustic model retraining process of the present invention will now be described in detail with reference to FIG. 9. FIG. 9 illustrates an exemplary acoustic model retraining module 316 of the present invention. As illustrated, the acoustic model retraining module 316 includes an acoustic model training data selection sub-routine 1502, feature filter 1506, codeword designator 1508, vector quantization (VQ) table 1509, phonetic transcriber 1510, phonetic recognizer 1514, phonetic representation selector 1515 and an acoustic model trainer 1516.

The acoustic model retraining module 316 receives as its input the acoustic model used to perform the most recent speech recognition operation on the audio corpus, e.g., initial acoustic model 410, the audio data included in audio corpus 10, and the set 407 of correctly recognized words with the audio time stamps.

The phonetic transcriber 1510 receives the text corresponding to each correctly recognized word and generates there from one or more phonetic transcriptions of each word. In the case of words where alternative pronunciations are possible, the phonetic transcriber 1510 generates a set of phonetic transcriptions for each word including alternative pronunciations. The set 1512 of phonetic representations, including alternative pronunciations, is supplied to the phonetic representation selector 1505.

The acoustic model training data selection sub-routine 1502 receives the correctly recognized words and corresponding audio time stamps 407. It uses the received time stamps to retrieve the audio segments from the audio corpus 10 corresponding to each correctly recognized word. Each retrieved audio segment 1504 is then supplied to the feature filter 1506 for processing.

The feature filter 1506 may be implemented as a conventional array processor that performs spectral analysis to compute a magnitude value for each frequency band of a frequency spectrum. Known methods of spectral analysis include fast Fourier transforms, linear predictive coding, and other acoustic parameterizations such as cepstral coefficients. In the exemplary embodiment the spectral analysis is performed every 10 milliseconds such that each word in the set of data selected for training purposes is made up of many 10 millisecond time frames with a frequency spectrum for each frame.

The frequency spectrum for each frame of a word is transmitted to the codeword designator 1508. The codeword designator compares each frame to numerous acoustic feature prototypes represented by codewords in a vector quantization table 1509. In the exemplary embodiment, there are 256 codewords in the VQ table 1509 which are chosen to adequately cover the entire human speaking range. Each codeword is a vector that includes average values for approximately 128 frequency bands. The codeword that most closely matches the frequency spectrum distribution of an input frame is associated by the codeword designator 1504 with that frame. The codeword designator 1508 outputs a string of codewords for each spoken word which is supplied to the phonetic recognizer 1514 and acoustic model trainer 1516.

The phonetic recognizer 1514 processes the codewords representing each word and generates there from a phonetic representation for each word. The phonetic representations of the recognized words are then supplied to the phonetic representation selector 1515.

The phonetic representation selector 1515 compares the phonetic representation generated from the audio corresponding to each word to the phonetic representation, or representations, of the word produced by the phonetic transcriber 1510. When there is a reasonable match between the phonetic representation generated from the audio and at least one of the phonetic representations of the word generated from the phonetic transcriber, then the output of the phonetic transcriber which most closely matches the output of the phonetic recognizer for the same word, is selected to be the phonetic representation that is supplied to the acoustic model trainer as training data. Whether a reasonable match exits between the output of the phonetic recognizer and the phonetic transcriber for a particular word may be determined by comparing a score of the phonetic representations versus a score found by the phonetic transcriber and determining if the score of the phonetic representation is within a preselected threshold of the score found by the phonetic transcriber, e.g., within 40%. By using the results of the speech recognition operation to select the phonetic representation used for re-training, the pronunciation characteristics of the speaker or speakers which produced the audio corpus are reflected in the acoustic model re-training process.

When there is a significant difference between the phonetic representation of a word generated by the phonetic recognizer 1514 and the phonetic representations of the same word generated by the phonetic transcriber 1510, e.g., there is not at least a 40% match between the output of the phonetic recognizer and at least one of the phonetic representations of the word generated by the phonetic transcriber, in accordance with one feature of the present invention, the output of the phonetic recognizer as opposed to the phonetic transcriber 1510 is selected for re-training purposes.

The phonetic representation for each word being trained, that is selected by the phonetic representation selector 1515, is supplied to the acoustic model trainer 1516. The acoustic model trainer also receives the codewords generated from the audio segment corresponding to each word being trained and the previously used acoustic model, e.g., the initial acoustic model 410. Using the supplied data, the acoustic model trainer 1516 performs a acoustic model training operation using any one of a plurality of known training techniques. The resulting updated acoustic model 413 is stored in memory segment 411 for use during the next iteration of the speech recognition process.

In the above described manner, the acoustic model used for file synchronization purposes is improved through an iterative training process that converts an initial speaker independent acoustic model into a speaker trained acoustic model which is likely to provide improved speech recognition results when used on audio corpus 10.

Figure 10:
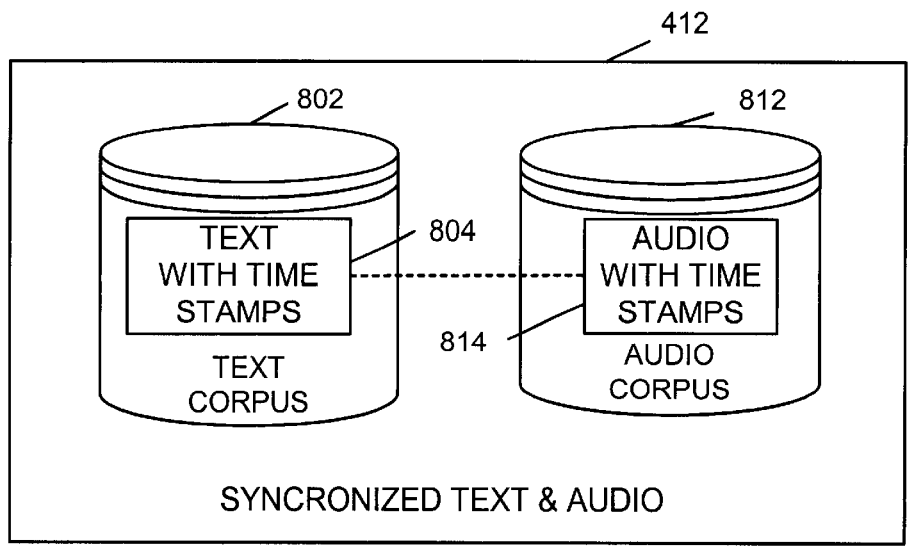
FIGS. 10, 12 and 14 illustrate exemplary synchronized text and audio corpuses created in accordance with various embodiments of the present invention.

Various formats for the generated set 412 of synchronized audio and text files will now be described with reference to FIGS. 10–13. FIG. 10 illustrates a set 412 of synchronized text and audio files corresponding to the same exemplary literary work. In the FIG. 10 embodiment, a single text file 804, including time stamps, is used to represent the text corpus 802. A single audio file 814 which includes the same time stamps as text file 804, is used to represent the audio corpus 812. The dashed line between the text and audio files 804, 814 represents the linking of the audio and text files through the use of common time stamps.

Figure 11:
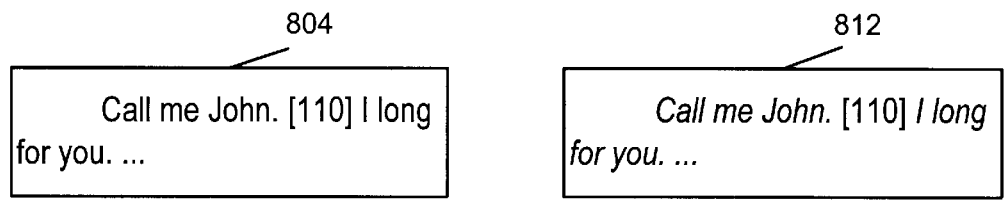
FIGS. 11, 13 and 15 illustrate exemplary content of the aligned audio and text corpuses shown in FIGS. 10, 12 and 14, respectively.

FIG. 11 shows a portion of the text file 804. Note that the time stamp [110], corresponding to the start of the silence detected in row 716 of the set of exemplary recognized text, has been inserted before the word I as a pointer into the audio file 814. In FIG. 11 italicized text is used to represent audio signals, e.g., speech, corresponding to the text. Note that in the audio file 814, the time stamp [110] has been inserted at the point where silence starts between the words John and I. Since the pointer [110] is located from a content perspective at the same position in the audio and text files 804, 814, the pointer serves to synchronize the audio and text files in accordance with the present invention.

Figure 12:
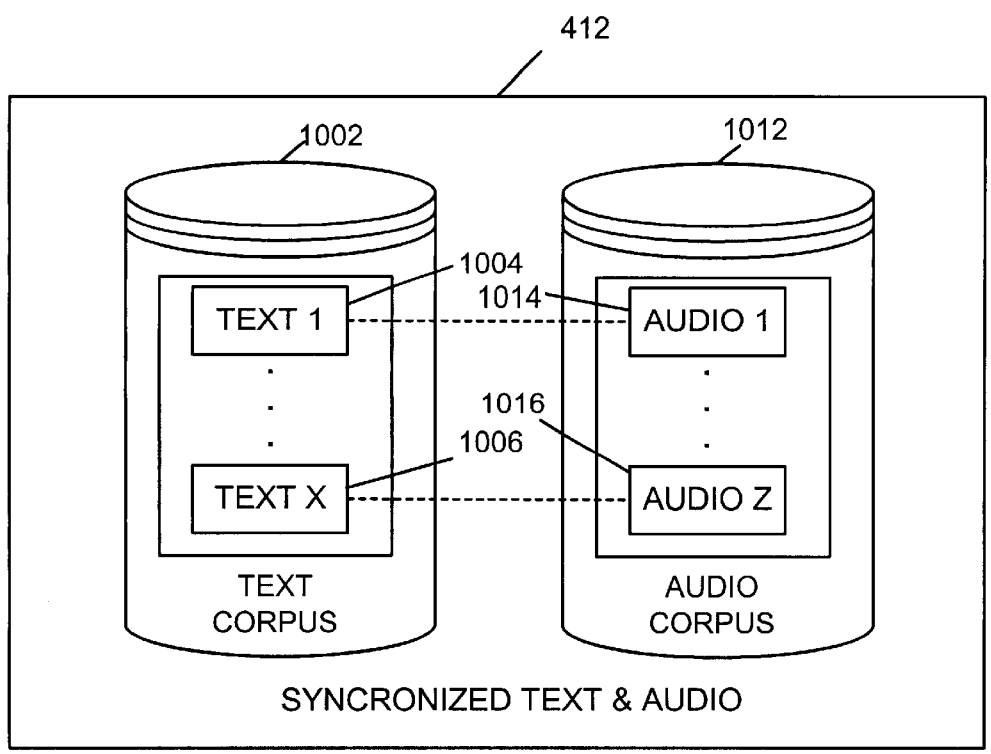
Figure 13:
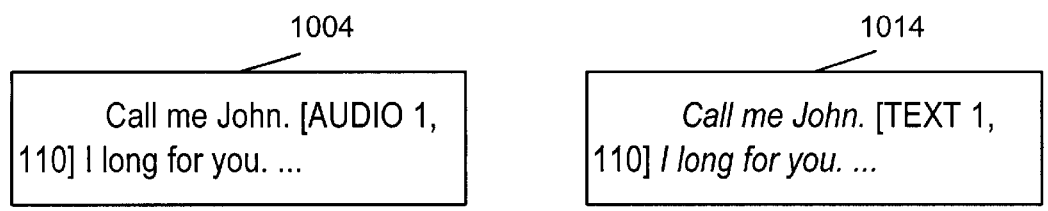

FIG. 12 illustrates an embodiment where the set 412 of synchronized text and audio files includes a text corpus 1002 and an audio corpus 1012. The text corpus 1002 comprises multiple text files 1004, 1006 while the audio corpus 1012 comprises multiple audio files 1014, 1016. The X number of audio files 1004, 1006 may be different than the Z number of audio files 1014, 1016. In the FIG. 10 embodiment, at points identified for synchronization purposes, pointers are included in the text and audio files. As illustrated in FIG. 13, in the pointers in the text file 1004 include a file identifier, e.g., the name AUDIO 1, of the audio file being pointed to and a time index, e.g., 110, used to access a specific location within the audio file. In a similar fashion, the pointers in the audio file 1014 include a file identifier, e.g., the name TEXT 1, of the text file being pointed to and a time index, e.g., 110, used to access the specific location within the text file.

Figure 14:
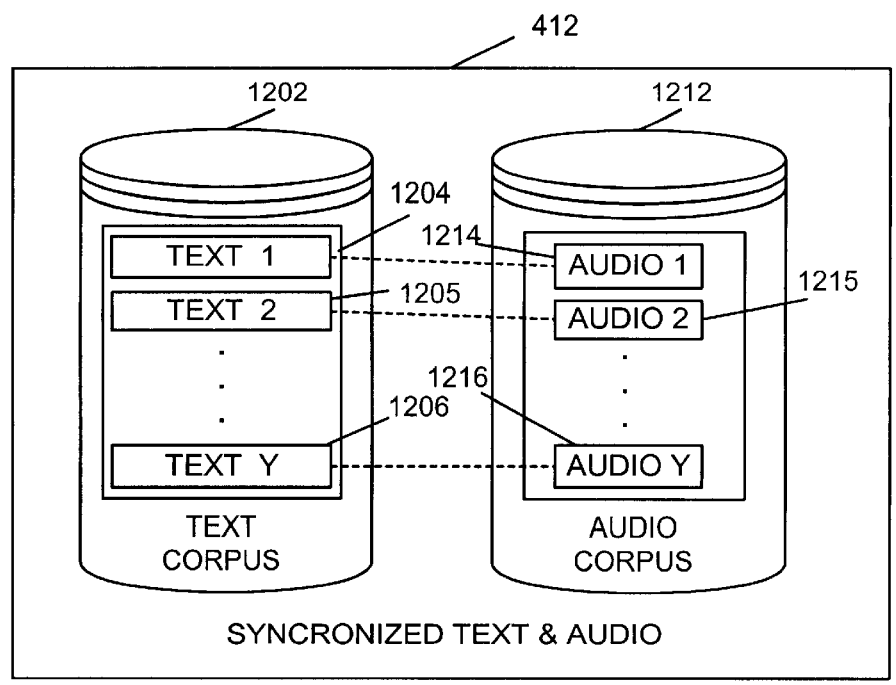
Figure 15:
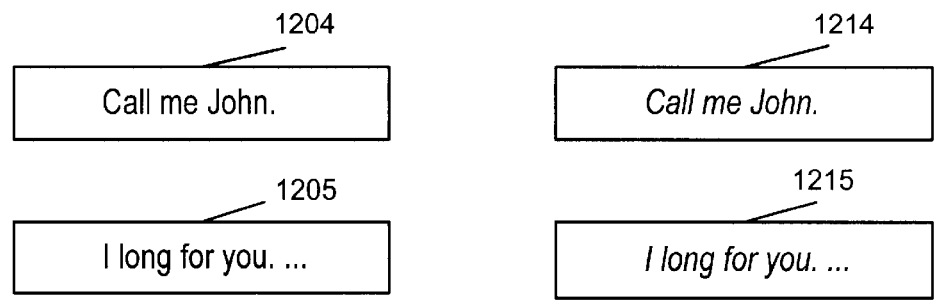

Rather than incorporate pointers into the audio and text files, in step 610, the text corpus 1202 may be divided into the same number Y of files as the audio corpus 1212. This produces a text corpus 1202 having Y text files 1204, 1205, 1206 and an audio corpus 1212 also with Y files 1214, 1215, 1216. In the FIG. 14 embodiment, text file, TEXT n, includes the same content as audio file, AUDIO n, albeit in a different format, e.g., audio vs. text format. In such an embodiment, the file number which forms part of the file name serves as an index to identify the corresponding audio or text file. In the FIG. 14 embodiment, each point of silence identified to be used for synchronization purposes would mark the start of a new file. Such an embodiment may result in, e.g., an audio and text file for each sentence or paragraph. FIG. 15 illustrates exemplary text files 1204 and 1205 as well as corresponding exemplary audio files 1214, 1215. Note that the audio files 1204, 1205 and text 1214, 1215 files are split at the point where silence was detected bracketed by properly identified words. Note also that text file, TEXT 1 1204, includes the same information content as audio file, AUDIO 1 1214.

A wide variety of other formats for the set 412 of synchronized audio and text data generated in accordance with the present invention are also possible. For example, the synchronized audio and text data could be stored in a single file with links, e.g., pointers, synchronizing portions of the audio and text data which have been found to correspond to each other.

While the above information has been described primarily in terms of its ability to be used to synchronize audio and text data corresponding to literary works, it is to be understood that it can also be used in a wide variety of other applications where audio and text data representing different expressions of the same information need to be synchronized. Accordingly, the methods of the present invention can be used, e.g., to synchronize transcripts of audio information with the audio version of the information.

Various exemplary embodiments have been described above. In view of the description provided above, various modifications will be apparent to those skilled in the art without deviating from the inventive teachings described and claimed herein.

What is claimed is:

1. A method of processing audio data and text data comprising:

performing a speech recognition operation on the audio data using an initial acoustic model to produce a set of recognized text including words;

identifying, as a function of words included in said text data, correctly recognized words in the set of recognized text data;

selecting a subset of said audio data, corresponding to the correctly recognized words, for re-training purposes, the subset of said audio data including less than all of said audio data; and re-training the initial acoustic model, using the selected subset of audio data corresponding to correctly recognized words as training data, to produce an updated acoustic model.

2. The method of claim 1, further comprising:
performing an additional speech recognition operation on the audio data using the updated acoustic model; and
synchronizing the audio and text data by using the results of the additional speech recognition operation to identify points in the audio and text data which correspond to one another.

3. A method of processing audio data and text data comprising:
performing a speech recognition operation on the audio data using an initial acoustic model to produce a set of recognized text including words;
identifying, as a function of words included in said text data, correctly recognized words in the set of recognized text data;
re-training the initial acoustic model, using the audio data corresponding to correctly recognized words as training data, to produce an updated acoustic model;
performing an additional speech recognition operation on the audio data using the updated acoustic model; and
synchronizing the audio and text data by using the results of the additional speech recognition operation to identify points in the audio and text data which correspond to one another, wherein synchronizing the audio and text data includes the act of:
aligning a set of recognized words separated by silence produced by performing said additional speech recognition operation with words, separated by punctuation corresponding to silence, included in the text data.

4. The method of claim 1, wherein re-training the initial acoustic model includes the acts of:
operating a phonetic recognizer to generate a phonetic representation of each correctly recognized word from the audio data corresponding to the correctly recognized word;
operating a phonetic transcriber to generate from a text representation of at least some of the correctly identified words, a plurality of possible phonetic representations of each word; and
selecting to be used for acoustic model retraining purposes, from the plurality of possible phonetic representations of each word, the transcribed phonetic representation which most closely matches the phonetic representation generated for the corresponding word by the phonetic recognizer.

5. The method of claim 4, wherein re-training the initial acoustic model further includes the acts of:
performing an acoustic model training operation using the selected transcribed phonetic representations, the initial acoustic model, and the audio data corresponding to the words for which transcribed phonetic representations have been selected.

6. The method of claim 5, wherein re-training the initial acoustic model further includes the acts of:
using the updated acoustic model as the initial acoustic model;
and repeating, until a pre-selected acoustic model updating stop criterion is satisfied, the steps of:
performing a speech recognition operation on the audio data using the initial acoustic model to produce a set of recognized text including words;
using the text data to identify correctly recognized words in the set of recognized text data; and
re-training the initial acoustic model using the audio data corresponding to correctly recognized words as training data to produce an updated acoustic model.

7. The method of claim 6, wherein the pre-selected acoustic model updating stop criterion is a failure of the updated acoustic model to produce improved speech recognition results when used to perform a speech recognition operation on said audio data.

8. The method of claim 2, wherein re-training the initial acoustic model includes the acts of:
operating a phonetic recognizer to generate a phonetic representation of each correctly recognized word from the audio data corresponding to the correctly recognized word;
operating a phonetic transcriber to generate from a text representation of at least some of the correctly identified words, a plurality of possible phonetic representations of each word; and
for each word for which a plurality of possible phonetic representations are generated by the phonetic transcriber:
determining if at least one of the plurality of phonetic representations of the word matches the phonetic representation of the word generated by the phonetic recognizer; and
selecting the phonetic representation generated by the phonetic recognizer to be used in training the updated acoustic model when it is determined that none of the plurality of phonetic representations of the word generated by the phonetic transcriber matches the output of the phonetic recognizer for the corresponding word.

9. The method of claim 8, wherein for each word for which a plurality of possible phonetic representations are generated by the phonetic transcriber, re-training the initial acoustic model includes the further acts of:
selecting the phonetic representation generated by the phonetic transcriber which most closely matches the output of phonetic recognizer for the word, when it is determined that at least one of the plurality of phonetic representations of the word generated by the phonetic transcriber matches the output of the phonetic recognizer for the corresponding word.

10. A method of processing audio data and text data comprising:
performing a speech recognition operation on the audio data using an initial acoustic model to produce a set of recognized text including words;
identifying, as a function of words included in said text data, correctly recognized words in the set of recognized text data; and
re-training the initial acoustic model, using the audio data corresponding to correctly recognized words as training data, to produce an updated acoustic model;
performing an additional speech recognition operation on the audio data using the updated acoustic model; and
synchronizing the audio and text data by using the results of the additional speech recognition operation to identify points in the audio and text data which correspond to one another, synchronizing the audio and text data including:
i. globally aligning recognized text produced by performing the speech recognition operation using the updated acoustic model with words included in the text data;
ii. identifying a first location in the recognized text where silence was recognized and where at least one correctly recognized word adjoins the recognized silence; and iii. inserting into the text data, at the location aligned with said first identified location, a pointer to the audio data corresponding to the recognized silence.

11. The method of claim 10,
where the first identified location is a location in the recognized text where silence is expected to occur based on information included in the aligned text data; and
wherein synchronizing the audio and text data further comprising the acts of:
identifying an additional location in the recognized text where silence was recognized and additional silence was expected to occur based on information included in the aligned text data and where at least one correctly recognized word adjoins the additional recognized silence; and
inserting into the text data, at the location aligned with said additional identified location, a pointer to the audio data corresponding to the additional recognized silence.

12. The method of claim 2, wherein synchronizing the audio and text data includes the acts of:
globally aligning recognized text produced by performing the speech recognition operation using the updated acoustic model with words included in the text data;
identifying a first location in the recognized text where silence was recognized and where at least one correctly recognized word adjoins the recognized silence; and
inserting into the text data, at the location aligned with said first identified location, a pointer to the audio data corresponding to the recognized silence.

13. The method of claim 10,
where the first identified location is a location in the recognized text where silence is expected to occur based on information included in the aligned text data; and
wherein synchronizing the audio and text data further comprises the acts of:
identifying an additional location in the recognized text where silence was recognized and additional silence was expected to occur based on information included in the aligned text data and where at least one correctly recognized word adjoins the additional recognized silence; and
inserting into the text data, at the location aligned with said additional identified location, a pointer to the audio data corresponding to the additional recognized silence.

14. The method of claim 13,
wherein the audio data and text data are unsynchronized audio and text versions, respectively, of the same literary work;
wherein the initial acoustic model is a speaker independent acoustic model; and
wherein the updated acoustic model is a speaker trained acoustic model.

15. The method of claim 2,
wherein the audio data and text data are unsynchronized audio and text versions, respectively, of the same literary work;
wherein the initial acoustic model is a speaker independent acoustic model; and
wherein the updated acoustic model is a speaker trained acoustic model;
the method further comprising:
generating a report, using the speech recognition results obtained by performing the additional speech recognition on the audio data, identifying discrepancies between the audio data and the text data.

16. The method of claim 1, wherein retraining the initial acoustic model includes the acts of:
supplying the identified correctly recognized words to an acoustic model retraining device; and
operating the acoustic model retraining device to retrain the initial acoustic model using the correctly recognized words as training data.

17. A computer readable medium, comprising:
computer executable instructions for controlling a computer device to
perform a speech recognition operation on the audio data using an initial acoustic model to produce a set of recognized text including words;
identify, as a function of words included in said text data, correctly recognized words in the set of recognized text data;
select a subset of said audio data, corresponding to the correctly recognized words, for re-training purposes, the subset of said audio data including less than all of said audio data; and
re-train the initial acoustic model, using the selected subset of audio data corresponding to correctly recognized words as training data, to produce an updated acoustic model.

18. A device for processing electronic text data and electronic audio data, comprising:
memory for storing an initial speaker independent acoustic model;
a speech recognizer for performing a first speech recognition operation on the audio data, as a function of the initial speaker independent acoustic model, to produce a set of recognized text;
means for identifying, as a function of words included in said text data, words which are correctly recognized by the speech recognizer;
an audio data selection module for selecting a subset of said audio data, corresponding to words which were correctly recognized by the speech recognizer, for re-training purposes, the subset of said audio data including less than all of said audio data; and
an acoustic model trainer for re-training the initial acoustic model, using the subset of said audio data corresponding to correctly recognized words as training data, to thereby produce an updated acoustic model.

19. The device of claim 18, further comprising:
means for using the updated acoustic model to perform a second speech recognition operation on said audio data; and
means for synchronizing the audio data and the text data as a function of recognized text produced using the updated acoustic model.

20. The device of claim 19, wherein the acoustic model trainer includes:
a phonetic recognizer for generating phonetic representations of recognized words from audio data corresponding to said words;
a phonetic transcriber for generating a plurality of phonetic transcriptions for at least some words for which the phonetic recognizer generates a phonetic representation; and a phonetic representation selector coupled to the phonetic recognizer and phonetic transcriber for selecting one of the phonetic representations output by the phonetic transcriber for each word used by the acoustic model trainer for re-training the initial acoustic model.

21. The device of claim 19, wherein the acoustic model trainer includes:

a phonetic recognizer for generating phonetic representations of recognized words from audio data corresponding to said words;

a phonetic transcriber for generating a plurality of phonetic transcriptions for at least some words for which the phonetic recognizer generates a phonetic representation; and a phonetic representation selector for selecting, as a function of the output of the phonetic recognizer, one of the phonetic representations output by the phonetic transcriber or the phonetic recognizer for each word used by the acoustic model trainer for re-training the initial acoustic model.

22. A device for processing electronic text data and electronic audio data, comprising:

memory for storing an initial speaker independent acoustic model;

a speech recognizer for performing a first speech recognition operation on the audio data, as a function of the initial speaker independent acoustic model, to produce a set of recognized text;

means for identifying, as a function of words included in said text data, words which are correctly recognized by the speech recognizer;

an acoustic model trainer for re-training the initial acoustic model, using audio data corresponding to correctly recognized words as training data, to thereby produce an updated acoustic model;

means for using the updated acoustic model to perform a second speech recognition operation on said audio data; and means for synchronizing the audio data and the text data as a function of recognized text produced using the updated acoustic model, said means for synchronizing the audio data and the text data including:

means for globally aligning text recognized by performing a speech recognition operation on the audio data using the updated acoustic model with words included in the text data;

means for identifying a first location in the recognized text where silence was recognized and where at least one correctly recognized word adjoins the recognized silence; and means for inserting into the text data, at the location aligned with said first identified location, a pointer to the audio data corresponding to the recognized silence.

23. The device of claim 22, further comprising:

a statistical language model generation module coupled to the speech recognizer for generating from the text data a statistical language model used by the speech recognizer when performing a speech recognition operation on the audio data.

24. The device of claim 19, further comprising:

means for generating a report of discrepancies between the content of the audio data and text data based on speech recognition results obtained by using the updated acoustic model to perform a speech recognition operation on the audio data.

25. A device for processing audio data and text data corresponding to the same work, comprising:

a speech recognizer for performing a speech recognition operation on the audio data to produce a set of recognized text;

means for aligning the set of recognized text with the text data;

means for comparing the recognized text to the text data to identify inconsistencies between the recognized text and text data;

means for generating a report including information about identified inconsistencies between the audio and text data corresponding to the same work;

a language model for use by the speech recognizer when performing a speech recognition operation;

an initial speaker independent acoustic model for use by the speech recognizer with said language model when performing an initial speech recognition operation on the audio data; and means for re-training the initial acoustic model to produce an updated acoustic model through an iterative acoustic model training process which uses a subset of said audio data, the subset of audio data corresponding to words which are determined by said comparing means to have been correctly recognized and including less than all of said audio data.

26. The device of claim 25, wherein the means for retraining the initial acoustic model includes:

a phonetic recognizer for generating phonetic representations of recognized words from audio data corresponding to said words;

a phonetic transcriber for generating a plurality of phonetic transcriptions for at least some words for which the phonetic recognizer generates a phonetic representation; and a phonetic representation selector for selecting, as a function of the output of the phonetic recognizer, one of the phonetic representations output by the phonetic transcriber or the phonetic recognizer for each word used by the acoustic model trainer for re-training the initial acoustic model.

27. The device of claim 26, wherein the audio data and text data represent unsynchronized audio and text versions, respectively, of the same literary work.

28. The device of claim 26, wherein the audio data represents an audio version of a program and wherein the text data represents a transcript of the audio version of said program.

* * * * *